United States Patent
Choi et al.

(10) Patent No.: US 7,326,098 B2
(45) Date of Patent: Feb. 5, 2008

(54) METHOD OF FABRICATING A FIELD EMISSION BACKLIGHT DEVICE

(75) Inventors: Jun-Hee Choi, Suwon-si (KR); Byong-Gwon Song, Seoul (KR); Moon-Jin Shin, Iksan-si (KR); Andrei Zoulkarneev, Suwon-si (KR); Deuk-Seok Chung, Seongnam-si (KR); Min-Jong Bae, Gyeonggi-do (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 11/673,736

(22) Filed: Feb. 12, 2007

(65) Prior Publication Data
US 2007/0135014 A1 Jun. 14, 2007

Related U.S. Application Data

(62) Division of application No. 11/054,943, filed on Feb. 11, 2005, now Pat. No. 7,193,357.

(30) Foreign Application Priority Data
Feb. 14, 2004 (KR) .................. 10-2004-0009838

(51) Int. Cl.
*H01J 9/00* (2006.01)
(52) U.S. Cl. .................. 445/26; 445/24; 445/25

(58) Field of Classification Search .................. None
See application file for complete search history.

(56) References Cited

U.S. PATENT DOCUMENTS

| | | | |
|---|---|---|---|
| 5,760,858 A | 6/1998 | Hodson et al. | |
| 6,777,869 B2 | 8/2004 | Pavlovsky | |
| 6,882,094 B2 * | 4/2005 | Dimitrijevic et al. | 313/346 R |
| 6,979,949 B2 | 12/2005 | Yonezawa et al. | |
| 2004/0222734 A1 | 11/2004 | Oh | |
| 2004/0256975 A1 * | 12/2004 | Gao et al. | 313/495 |
| 2006/0091780 A1 * | 5/2006 | Minami | 313/495 |

* cited by examiner

*Primary Examiner*—Ashok Patel
(74) *Attorney, Agent, or Firm*—H.C. Park & Associates, PLC

(57) ABSTRACT

A field emission backlight device may include a first substrate and a second substrate separate from and roughly parallel to each other, a first anode electrode and a second anode electrode that face each other on inner surfaces of the first substrate and the second substrate, and cathode electrodes separate from and roughly parallel to one another between the first substrate and the second substrate. It may also include electron emission sources disposed on the cathode electrodes to emit electrons by an electric field and a phosphorous layer disposed on the first anode electrode or the second anode electrode.

4 Claims, 3 Drawing Sheets

METHOD OF FABRICATING A FIELD EMISSION BACKLIGHT DEVICE

CROSS-REFERENCE TO RELATED APPLICATIONS

This application is a divisional of prior application Ser. No. 11/054,943, filed Feb. 11, 2005, now U.S. Pat. No. 7,193,357 which claims priority to and the benefit of Korean Patent Application No. 10-2004-0009838, filed on Feb. 14, 2004, which are all hereby incorporated by reference for all purposes as if fully set forth herein.

BACKGROUND OF THE INVENTION

1. Field of the Invention

The present invention relates to a field emission backlight device and a method of fabricating a field emission backlight device. More particularly it relates to a field emission backlight device for a Liquid Crystal Display (LCD), and method of fabricating such a device.

2. Description of the Related Art

LCDs sometimes include a backlight device installed at a rear surface to supply white light. Typically, a cold cathode tube is used as the backlight device. In many instances, such a backlight device may be appropriate, but it is not very slim.

As shown in FIG. 1, the conventional backlight device includes spacers (not shown) between a front substrate 1 and a rear substrate 4. A wall (not shown) is sealed between the front substrate 1 and the rear substrate 4. A cathode electrode 5 is installed in a type of a surface electrode or a stripe on the rear substrate 4, and a field emission source (such as a carbon nanotube) 6 is disposed on the cathode electrode 5. An anode electrode 2 is disposed on the front substrate 1. A phosphorous layer 3 is coated on the anode electrode 2.

When a predetermined voltage is applied to the cathode electrode 5 and the anode electrode 2, electrons emit from the field emission source 6 to excite the phosphorous layer 3. Light emitting from the phosphorous layer 3 passes through the phosphorous layer 3, the anode electrode 2 and the front substrate 1 to be incident on the LCD.

In the conventional flat backlight device, electrons concentratedly emit at an edge of the cathode electrode 5, thereby causing non-uniform luminance.

Specifically, due to the large-size of the LCD, a drawback of non-uniform luminance is increasingly serious.

U.S. Pat. No. 5,760,858 discusses a triode structure of a field emission backlight device having good energy efficiency. The field emission backlight device is combined with a liquid crystal panel, thereby making it possible to perform backlighting with a low consumption power and providing high uniform luminance due to a whole flat-surface emission way.

However, the backlight device of U.S. Pat. No.: 5,760,858 has the same structure of Field Effect Display (FED) employing a Spindt type. Since this kind of structure of the backlight device is fabricated together with the LCD panel, the fabrication method thereof is complicated. Specifically, the field emission structure is fabricated using a semiconductor fabrication process, thereby increasing fabrication cost and providing a low yield considering the relatively simple structure of the LCD panel.

SUMMARY OF THE INVENTION

The present invention provides a field emission backlight device capable of providing uniform luminance having a field emission unit disposed between a rear substrate and a front substrate.

Also, the present invention provides a method of fabricating a field emission backlight device by growing carbon nanotube (CNT) within a panel.

A field emission backlight device can include a first substrate and a second substrate separate from and roughly parallel to each other, and a first anode electrode and a second anode electrode that face each other on inner surfaces of the first substrate and the second substrate, respectively. It may also include cathode electrodes separate from and roughly parallel to one another between the first substrate and the second substrate and electron emission sources disposed on the cathode electrodes to emit electrons by an electric field. It may also include a phosphorous layer disposed on the first anode electrode or the second anode electrode.

The first and second anode electrodes can be flat electrodes. However, the cathode electrode can be cylindrical and can have a diameter of about 0.05 mm to about 2 mm.

Another embodiment of the present invention may include filament wires separate from and roughly parallel to one another between the first substrate and the second substrate. It may also include CNT catalytic metal films disposed on circumferences of the filament wires. The CNTs disposed on the catalytic metal films may emit electrons by an electric field. The embodiment may also include a phosphorous layer disposed on the first anode electrode or the second anode electrode.

The second substrate and the second anode electrode may have a plurality of gas inlet holes, and a gas chamber may be disposed at a lower side of the second substrate to cover the gas inlet holes. The filament wire may be cylindrical and may have a diameter of about 0.05 mm to about 2 mm.

Another embodiment of the present invention may include dipping the filament wires in CNT catalytic metal solution to form the CNT catalytic metal films on surfaces of the filament wires. It may also include disposing the filament wires having the CNT catalytic metal films between the first substrate and the second substrate and roughly parallel to one another. It can further include sealing the first substrate and the second substrate at their outer brinks to form an internal space between the first substrate and the second substrate. It can further include applying a predetermined voltage to the filament wires to heat the filament wires. It can also include introducing carbon-containing gas into the internal space to grow the CNT from the CNT catalytic metal film.

The catalytic metal film can be a material such as nickel (Ni), iron (Fe), cobalt (Co), or any combination thereof.

DETAILED DESCRIPTION OF THE INVENTION

Figure 1:
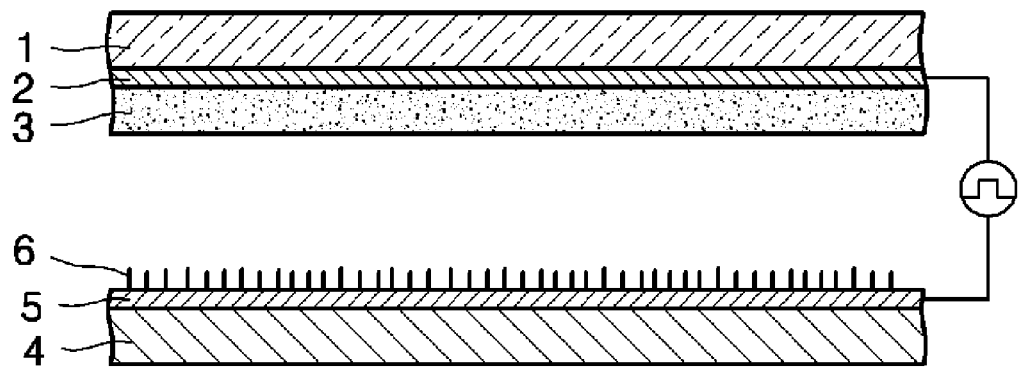
FIG. 1 is a sectional view illustrating a construction of a conventional backlight device for a liquid crystal display.

The present invention will now be described more fully with reference to the accompanying drawings, in which exemplary embodiments of the invention are shown. The invention may, however, be embodied in many different forms and should not be construed as being limited to the embodiments set forth herein. In the drawings, the thicknesses of layers and regions are exaggerated for clarity. When a layer is referred to as being "on" another layer or substrate, it can be directly on the other layer or substrate, or one or more intervening layers may also be present.

Figure 2:
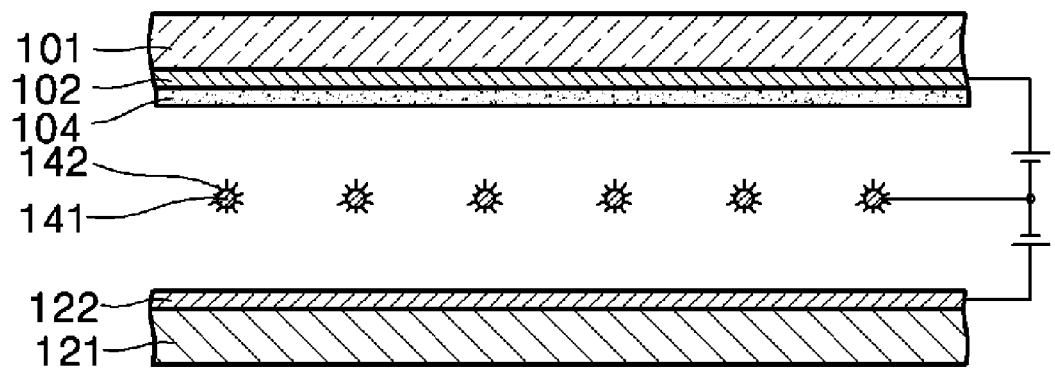
FIG. 2 is a sectional view illustrating a schematic construction of a field emission backlight device according to an embodiment of the present invention.

As shown in FIG. 2, the field emission backlight device may include a first substrate 101 and a second substrate 121. These substrates may be spaced apart from each other by a predetermined distance. The first and second substrates 101 and 121 can be formed of transparent material, for example, glass. The first substrate 101 or the second substrate 121 may be formed of material for allowing the transmission of light generated from a phosphorous layer 104, and may be disposed at the rear of an LCD.

The first substrate 101 has an inner surface on which a flat-type first anode electrode 102 (for example, an Indium-Tin-Oxide (ITO) transparent electrode) may be disposed. The second substrate 121 has an inner surface on which a flat-type second anode electrode 122 (for example, an ITO transparent electrode) may be disposed. Additionally, a plurality of cathode electrodes 141 may be disposed roughly parallel to one another between the first anode electrode 102 and the second anode electrode 122.

Each of the cathode electrodes 141 may be cylindrical. The cathode electrode 141 may have a circumference on which an electron emission source (for example, CNT material 142) may be coated. The cathode electrode 141 can have a diameter of, for example, about 0.05 mm to about 2 mm. One reason to select a particular diameter may be the hardness of the metal material. Additionally, each of the anode electrodes 102 and 122 can be spaced apart from the cathode electrode 141 by a distance of about 0.5 mm to about 3 mm.

Several kV may be applied to each of the first anode electrode 102 and the second anode electrode 122 with the cathode electrode 141 being a common electrode. The first anode electrode 102 may have an applied voltage that is about 0.5 to about 2 kV larger than the second anode electrode 122.

The first anode electrode 102 may have an inner surface on which the phosphorous layer 104 is coated to have a predetermined thickness of, for example, about 10μm. The phosphorus layer 104 may be excited by electrons of the electron emission source 142 to radiate a visible ray.

A wall frame (not shown) may be melted and adhered using frit at the outer brinks of the first anode electrode 102 and the second anode electrode 122. This may help to seal the backlight device. At least one end of the cathode electrode 141 may be externally tensioned. The tension structure of the cathode electrode 141 can be accomplished using a technology applied to filament tension in a general Vacuum Fluorescent Display (VFD). Accordingly, a detailed description thereof is omitted.

Figure 3:
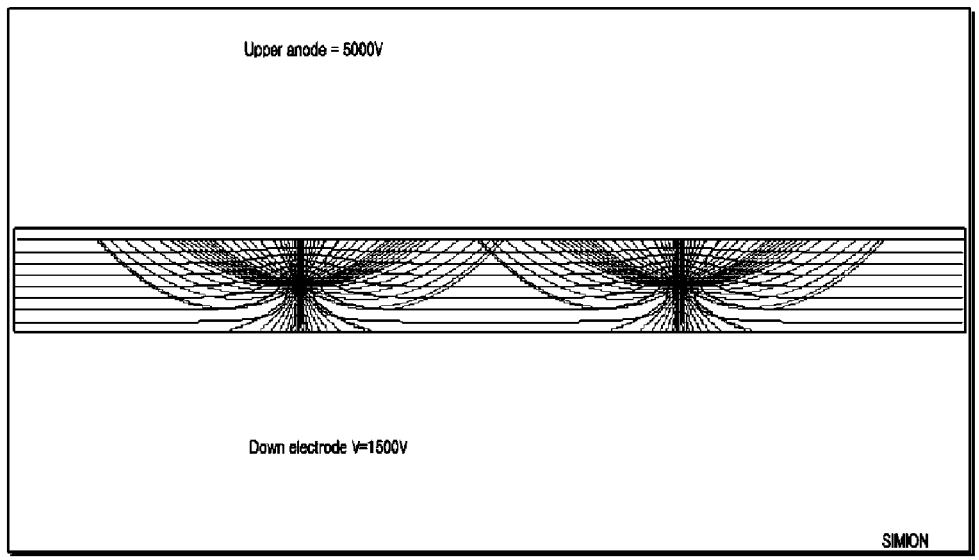
FIGS. 3 and 4 are simulation views illustrating electron flow in a field emission backlight device according to the present invention.

As shown in FIG. 3, the trajectories of electrons emitted by the CNT material 142 disposed on the circumference of the cathode electrode 141 may be simulated in a state where direct voltages or pulse voltages of about 5 kV and about 1.5 kV are respectively applied to the first anode electrode 102 and the second anode electrode 122. The first anode electrode 102 may be spaced apart from the second anode electrode 122 by a distance of about 5 mm, and the cathode electrode 141 may be interposed therebetween. Additionally, the cathode electrodes 141 having diameters of about 0.1 mm may be spaced apart from one another by a distance of about 20 mm. According to the above simulation, the backlight device having a size of about 40 inches may employ about 35 cathode electrodes 141.

As shown in FIG. 3, most of electrons emitted by the CNT material 142 disposed on two cathode electrodes 141 directed toward the first anode electrode 102 are able to be distinguished from each other. This causes electrons not to be evenly diffused in the backlight device.

Figure 4:
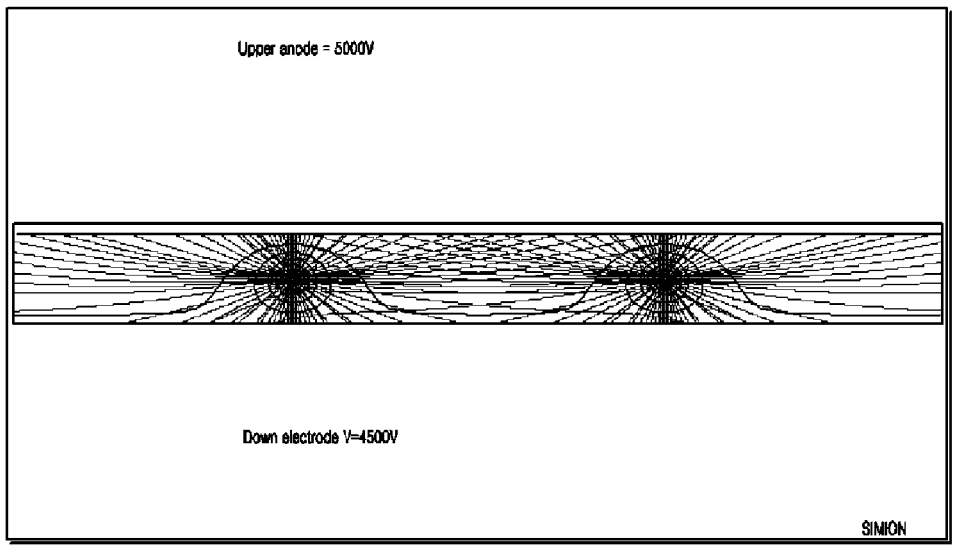

As shown in FIG. 4, direct voltages or pulse voltages of 5 kV and 4.5 kV may be respectively applied to the first anode electrode 102 and the second anode electrode 123. Electrons emitted from the CNT material 142 of the cathode electrode 141 may be evenly diffused to overlap with one another in the backlight device. Accordingly, the inventive backlight device may have uniform luminance, and can be used for a large-sized LCD.

From the simulation result, it can be understood that the second anode electrode 122 may have an applied voltage corresponding to the first anode electrode 102 to evenly diffuse electrons from the CNT material 142.

The CNT material 142 can be coated on a surface of the cathode electrode 141 by dipping the cathode electrode 141 in CNT solution containing the CNT material 142. Alternatively, the cathode electrode 141 may rotate while passing between two rollers having the CNT material 142 coated thereon, thereby coating the cathode electrode 141 with material 142.

Figure 5:
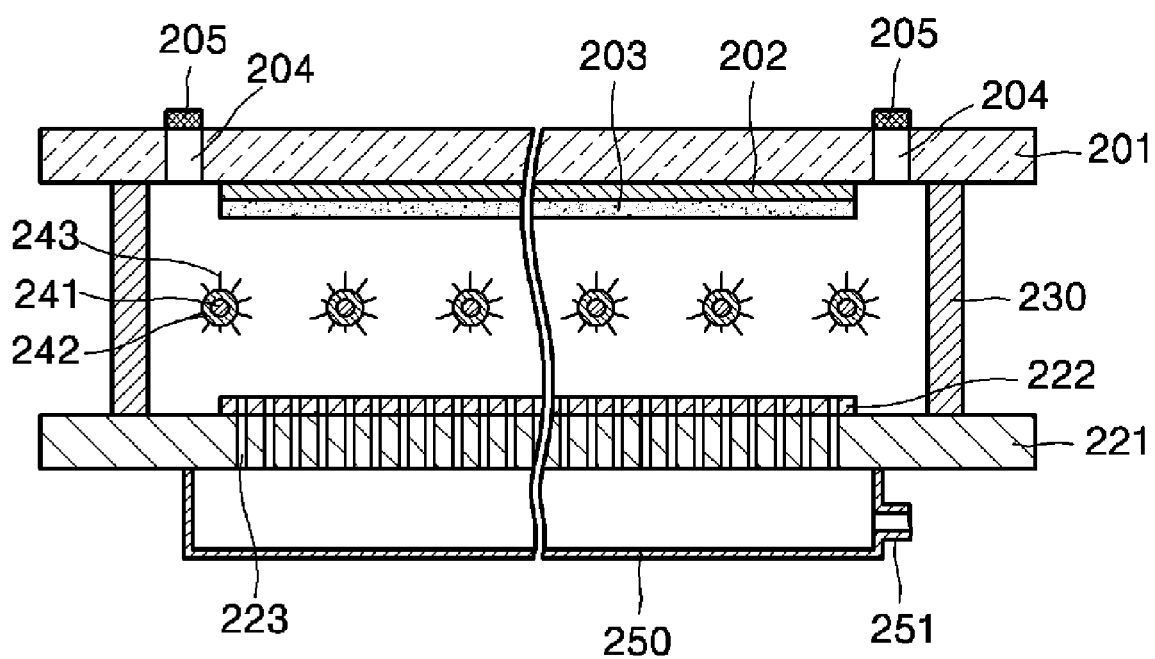
FIG. 5 is a sectional view illustrating a schematic construction of a field emission backlight device according to another embodiment of the present invention.

As shown in FIG. 5, the field emission backlight device may include a first substrate 201 and a second substrate 221. The substrates may be spaced apart by a predetermined distance. The first substrate 201 can be formed of transparent material, for example, glass. The second substrate 221 may be formed of transparent or opaque material. The first substrate 201 may be formed of material for allowing the transmission of light generated from a phosphorous layer 104, and may be disposed at the rear of an LCD.

The first substrate 201 may have an inner surface on which a flat-type first anode electrode 202 (for example, an ITO transparent electrode) may be disposed. The second substrate 221 may have an inner surface on which a flat-type second anode electrode 222 (for example, an ITO transparent electrode) may be disposed.

The anode electrode 202 may have an inner surface on which a phosphorous layer 203 may be coated. The anode electrode 202 may have a predetermined thickness of, for example, about 10μm. The phosphorus layer 203 may be excited by electrons from the electron emission source and may thus radiate a visible ray.

Additionally, a plurality of filament wires 241 may be disposed roughly parallel to one another between the first anode electrode 202 and the second anode electrode 222. Each of the filament wires 241 may be cylindrical. A filament used in the VFD can be used as the filament wire 241.

The filament wire 241 may have a circumference on which a catalytic metal film 242 (which may include, for example, Fe, Co, Ni, or an alloy thereof) may be formed. As an electron emission source, CNT material 243 may be formed on the catalytic metal film 242. The electron emission source 241 can have a diameter of about 0.05 mm to about 2 mm. Additionally, each of the anode electrodes 202 and 222 can be spaced apart from the filament wire 241 by a distance of about 0.5 mm to about 3 mm.

Several kV may be applied to each of the first anode electrode 202 and the second anode electrode 222 with the filament wire 241 serving as a common electrode. The first anode electrode 202 may have an applied voltage about 0.5 to about 2 kV larger than that of the second anode electrode 222.

A wall frame 230 may be disposed roughly parallel to the filament wire 241, near the outer brinks of the first anode electrode 202 and the second anode electrode 222. Additionally, a wall installed perpendicularly to the filament wire 241 may be obtained by melting frit paste to allow the passing of both ends of the filament wire 241. At least one end of the cathode electrode 241 may be externally tensioned.

The second substrate 221 and the second anode electrode 222 may have a plurality of through-holes (for example, inlet holes 223), and the first substrate 201 may have a gas exhaust hole 204 (which may be disposed outside of an active region). A gas chamber 250 may be installed at a lower part of the second substrate 221 to supply external gas to the inlet holes 223. A gas inlet pipe 251 may be installed at one side of the gas chamber 250. The inlet pipe 251 and the exhaust hole 204 may be sealed after CNT is grown. The exhaust hole 204 can be used to exhaust gas from the backlight device.

The inlet pipe 251 and the exhaust hole 204 is to grow CNT at the circumference of the filament wire 241. After the growing of the CNT, an end of the inlet pipe 251 is tipped-off and the through-hole 204 may be sealed using a sealing-cap 205.

Fabrication of First and Second Substrates

The first anode electrode (ITO electrode) 202 and the phosphorous layer 203 may be sequentially formed at the active region of the first substrate 201 formed of glass. Additionally, the exhaust hole 204 may be provided outside of the active region. The second anode electrode 222 may be formed on the second substrate 221. The plurality of gas inlet holes 223 may pass through the second substrate 221 and the second anode electrode 222. After that, the gas chamber 250 may be provided at the lower side of the second substrate 221 to cover the inlet holes 223. The gas inlet pipe 251 is provided at one side of the gas chamber 250.

Fabrication of Cathode Electrode

The cylindrical filament wire 241 having a size of about 0.1 mm may be dipped in solution having dissolved Fe, Co, Ni or alloys thereof (which may serve as a CNT catalytic metal film 242) to coat the catalytic metal on the circumference of the filament wire 241.

Fabrication of Panel

The first substrate 201 and the second substrate 221 are spaced apart by installing wall frames 230 there between. The filament wires 241 are spaced apart from one another by a predetermined distance between the first substrate 201 and the second substrate 221. Sealing paste(for example, frit paste) may be put in place and sintered at approximately 460° C. between the first substrate 201 and the second substrate 221 to make an external form of the backlight device. Then, at least one end of each filament wire 241 may be tensioned.

Growing of CNT

A predetermined voltage may be applied to the filament wire 241 to heat the filament wire 241 at approximately 700° C. After that, carbon-containing gas may be injected into the gas inlet pipe 251 to grow the carbon nanotube 243 from the surface of the catalytic metal film 242. As the carbon-containing gas, methane ($CH_4$), acetylene ($C_2H_2$), ethylene ($C_2H_4$), ethane ($C_2H_6$), carbon oxide (CO), carbon dioxide ($CO_2$) and the like can be used.

Next, gas may be exhausted out of the backlight device through the gas exhaust hole 204.

After the CNT has grown sufficiently, the inlet pipe 251 and the exhaust hole 204 may be sealed. Then, a hot outgassing device (not shown) can be connected to the exhaust hole 204 to allow an internal space of the backlight device to be in a high vacuum state through a hot outgassing process. During the hot outgassing process, the internal space may be heated to between about 320 and about 340° C. to exhaust various remaining gases from the internal space while performing the exhaust process. If the panel is at $\leq 10^{-5}$ torr, the sealing cap 205 may be attached on an exhaust hole 204 portion or the exhaust hole 204 portion may be melted to seal the vacuum space.

The inventive field emission backlight device uses the first anode electrode and the second anode electrode together, thereby evenly exhausting electrons from the cathode electrode between the anode electrodes and accordingly, enhancing the luminance. Accordingly, a diffuser may not be needed, thereby reducing the manufacture cost.

Further, if the filament wire is used as the cathode electrode, the CNT can be grown within the panel.

While the present invention has been particularly shown and described with reference to exemplary embodiments thereof, various changes in form and details may be made to these embodiments without departing from the scope of the present invention.

What is claimed is:

1. A method of fabricating a field emission backlight device having: a first substrate and a second substrate that is spaced apart from and roughly parallel to each other; a first anode electrode and a second anode electrode that face each other on inner surfaces of the first substrate and the second substrate, respectively; filament wires separate from and roughly parallel to one another between the first substrate and the second substrate; carbon nanotube catalytic metal films disposed on circumferences of the filament wires; carbon nanotubes disposed on the catalytic metal films to emit electrons by an electric field; and a phosphorous layer disposed on the first anode electrode or the second anode electrode, the method comprising:

dipping the filament wires in carbon nanotube catalytic metal solution to form the carbon nanotube catalytic metal films on surfaces of the filament wires;

disposing the filament wires having the carbon nanotube catalytic metal films between the first substrate and the second substrate and substantially parallel to one another;

sealing the first substrate and the second substrate at their outer brinks to form an internal space between the first substrate and the second substrate;

applying a predetermined voltage to the filament wires to heat the filament wires; and introducing carbon-containing gas into the internal space to grow the carbon nanotube from the carbon nanotube catalytic metal film.

2. The method of claim 1, wherein the filament wire has a diameter of about 0.05 mm to about 2 mm.

3. The method of claim 1, wherein the catalytic metal film comprises at least any one material selected from the group of nickel (Ni), iron (Fe), and cobalt (Co).

4. The method of claim 1, wherein the carbon-containing gas comprises at least any one gas selected from the group of methane ($CH_4$), acetylene ($C_2H_2$), ethylene ($C_2H_4$), ethane ($C_2H_6$), carbon oxide (CO), and carbon dioxide ($CO_2$).

* * * * *